2,862,857

AZEOTROPIC DISTILLATION OF MONOHYDRIC AND DIHYDRIC PHENOLS

Leo J. Filar, Wilmington, Del., assignor to Hercules Powder Company, Wilmington, Del., a corporation of Delaware No Drawing. Application July 1, 1954
Serial No. 440,840

5 Claims. (Cl. 202—42)

This invention relates to the manufacture of dihydric phenols and more particularly to dihydric phenols prepared by the acid-catalyzed cleavage of diisopropylbenzene dihydroperoxides.

It is known that p-diisopropylbenzene may be oxidized to p-diisopropylbenzene dihydroperoxide ($\alpha,\alpha,\alpha',\alpha'$-tetramethyl-p-xylylene dihydroperoxide), and that this dihydroperoxide may be decomposed by means of an acidic condensation catalyst to give hydroquinone. The hydroquinone may be recovered from the decomposition reaction mixture by azeotropic distillation with an organic solvent capable of forming an azeotrope with hydroquinone. The hydroquinone distills over with the azeotroping solvent and the hydroquinone is separated from the distillate by crystallizing therefrom or by extraction with water. The azeotroping solvent is then recycled to the still. The same general procedure is applicable to the preparation of resorcinol by decomposition of m-diisopropylbenzene dihydroperoxide ($\alpha,\alpha,\alpha',\alpha'$-tetramethyl-m-xylylene dihydroperoxide) which in turn is prepared by the oxidation of m-diisopropylbenzene.

In continuing such a process wherein the azeotroping solvent is recycled to the azeotropic distillation, there is a gradual decrease in efficiency of the azeotropic distillation and also in the ease and completeness of crystallization of the dihydric phenol from the distillate.

It has now been found that the azeotropic distillation process is greatly improved and that valuable by-products can be recovered by subjecting the azeotroping solvent from which the dihydric phenol has been removed to contact with an aqueous alkali metal hydroxide solution prior to recycling of the azeotroping solvent to the azeotropic distillation. It has been found, in addition, that valuable monohydric phenols are recovered from the spent aqueous alkali metal hydroxide solution by acidifying said solution with an acid and separating the liberated phenolic materials therefrom. Acidification may be effected with, for example, carbon dioxide or dilute solutions of hydrochloric and sulfuric acids.

In the case of hydroquinone the corresponding monohydric phenol is p-isopropyl phenol and with respect to resorcinol the corresponding monohydric phenol is m-isopropyl phenol. The hydroperoxides corresponding to these two monohydric phenols are $\alpha,\alpha$-dimethyl-p-isopropylbenzyl hydroperoxide and $\alpha,\alpha$-dimethyl-m-isopropylbenzyl hydroperoxide respectively.

The process of this invention is more particularly set forth in the following specific examples. All parts and percentages in this specification and claims are by weight unless otherwise noted.

*Example 1*

Air-oxidized m-diisopropylbenzene amounting to 52.2 parts and containing 9.7 parts monohydroperoxide and 32.1 parts dihydroperoxide was cleaved by gradually adding to a refluxing (60° C.) solution of 65 parts acetone containing 0.1 part concentrated sulfuric acid. The reaction mixture was heated for about 15 minutes, then neutralized by adding 0.25 part 50% aqueous potassium carbonate solution. The acetone was removed under reduced pressure and 75 parts chlorinated biphenyl containing 32% combined chlorine was added. The chlorinated biphenyl azeotrope was distilled off at 90° C. to 175° C. (10 mm. mercury pressure) in an amount of 95.7 parts. This distillate was partly crystalline on cooling and was extracted twice with water in 50 part amounts. From the combined water phases there was isolated 8.3 parts of resorcinol, melting point 107–110° C. The residue of the distillate remaining after the water extraction was twice extracted with aqueous 5% sodium hydroxide in 50 part amounts. The aqueous sodium hydroxide extracts were combined, acidified with hydrochloric acid and extracted with benzene. Distillation of the combined benzene extracts yielded 4.8 parts of m-isopropyl phenol.

*Example 2*

One hundred eighty-four parts of a m-diisopropylbenzene oxidate containing 30.8% m-diisopropylbenzene dihydroperoxide and 45.2% m-diisoproplybenzene monohydroperoxide was cleaved with concentrated sulfuric acid catalyst dissolved in acetone. After neutralization of the catalyst and removal of the acetone by stripping, the residue was distilled with 100 parts chlorinated biphenyl containing 32% combined chlorine. The distillate amounting to 214 parts was diluted with about 175 parts benzene, and the resulting slurry was three times extracted with water. In the first extraction 70 parts of water was utilized, and in the next two extractions 35 parts of water in each instance was used. From the combined aqueous extracts there was isolated 13.6 parts of resorcinol. The benzene layer remaining after the water extractions was in turn extracted with 222 parts of aqueous 10% sodium hydroxide and then washed with 150 parts of water. The combined aqueous layers after acidification yielded 43.6 parts of m-isopropyl phenol.

*Example 3*

An identical portion of the same m-diisopropylbenzene oxidate used in Example 2 was cleaved with an acid-treated bentonite as the catalyst. After filtration of the catalyst and removal of the acetone by stripping, the residue was distilled with a chlorinated biphenyl containing 32% combined chlorine. The distillate was diluted with an equal volume of benzene and filtered to remove 13.2 parts of resorcinol. Water extraction of the filtrate resulted in recovery of an additional 0.8 part of resorcinol. The organic raffinate was then extracted with aqueous 10% sodium hydroxide solution and with water. From the aqueous layers there was recovered 43.4 parts of m-isopropyl phenol.

*Example 4*

A decomposition reaction mixture prepared by the procedure of Example 2 was stripped of acetone. The residual material was then distilled with $\alpha$-chloronaphthalene until a portion of the distillate, on being cooled to 20° C., precipitated no resorcinol. The distillate was diluted with a half volume of hexane and the resorcinol was extracted with water. The organic raffinate was then extracted with aqueous 15% sodium hydroxide and finally with water. From the combined aqueous layers 43.8 parts of m-isopropyl phenol was isolated. The chloronaphthalene layer remaining after extraction with alkali was stripped of hexane diluent and recycled to the distillation system.

*Example 5*

The reaction mixture from the cleavage of 100 parts of a p-diisopropylbenzene oxidate which contained 49.3% dihydroperoxide and 31.6% monohydroperoxide was stripped of acetone after neutralization of the acid catalyst with magnesium oxide. The residual material was distilled in the presence of about 100 parts of chlorinated biphenyl containing about 32% combined chlorine to a head temperature of 185° C. at 20 mm. pressure. The distillate was distributed between benzene and water and 20.3 parts of crystalline hydroquinone was recovered from the aqueous phase. The organic phase was extracted with aqueous 5% sodium hydroxide using a 10% excess of the amount calculated to react with the theoretical yield of p-isopropyl phenol. From the alkaline extract there was recovered 19.5 parts of p-isopropyl phenol.

*Example 6*

One hundred ninety-five parts of crude m-diisopropylbenzene dihydroperoxide containing small amounts of m-diisopropylbenzene monohydroperoxide was decomposed using an acid catalyst. The product from the decomposition was neutralized and stripped of solvents and to the residual material was added approximately 500 parts of methyl naphthalene. The mixture then was distilled at atmospheric pressure (vapor temperature 240–242° C.) and several distillate fractions were collected. Upon being cooled, resorcinol crystallized from the various fractions and was filtered off, the filtrate being returned to the distillation vessel. This procedure was continued until resorcinol no longer crystallized from the distillate on cooling. Then the remaining methyl naphthalene was distilled off. There was obtained 51.5 parts of resorcinol. The residual methyl naphthalene distillate was washed twice with water, using 50 parts in each instance, to remove traces of resorcinol and was then extracted with three portions of 2 N sodium hydroxide, each portion amounting to 75 parts. The sodium hydroxide extracts were washed with ether and acidified with carbon dioxide. The precipitated oil was extracted with ether, the extract dried, the ether removed by distillation, and the residual material fractionated at 10 mm. in an atmosphere of nitrogen. m-Isopropyl phenol was recovered to the extent of 3.3 parts.

The process of this invention has been illustrated in the examples with respect to mixtures of dihydroperoxides and monohydroperoxides obtained by the oxidation of m-diisopropylbenzene and p-diisopropylbenzene. However, the process also is applicable to similar hydroperoxide mixtures obtained by the oxidation of a compound of a formula of the group consisting of

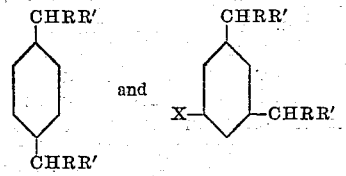

wherein R and R' represent alkyl groups having 1–2 carbon atoms and X represents a member of the group consisting of hydrogen, lower alkyl, and —CHRR'. Examples of R and R' are methyl and ethyl. Examples of X are methyl, ethyl, propyl, isopropyl, sec-butyl and 3-pentyl. Specific compounds which are particularly well suited for preparing the dihydroperoxide-monohydroperoxide mixtures used in the process of this invention are m-di-sec-butylbenzene, p-di-sec-butylbenzene, m-diisopropylbenzene, p-diisopropylbenzene, 1,3,5-triisopropylbenzene and 3,5-diisopropyltoluene. The corresponding mono- and dihydroperoxides of these compounds contain the hydroperoxide group or groups attached to the tertiary carbon of 1 or 2 of the alkyl radicals, thereby forming radicals of the formula —CRR'OOH.

The hydroperoxide mixtures utilized in the process of this invention may be prepared by any of the oxidation processes in the art, for example, the processes of U. S. 2,548,435, U. S. 2,632,772, U. S. 2,547,938 and U. S. 2,619,510. The oxidation process appears to be a stepwise reaction, the monohydroperoxides being formed first and the dihydroperoxides being formed subsequently from the monohydroperoxides. It is preferable in the process of this invention to use a reaction mixture containing a substantial amount of the dihydroperoxide and a much smaller amount of the corresponding monohydroperoxide. Such a mixture is obtained by extracting the dihydroperoxide as the major component from the oxidate by contacting the oxidate with an aqueous alkali solution having a concentration in the range of 0.1 to 15%. The residual monohydroperoxide and unreacted hydrocarbon are then recirculated to the oxidation step, thereby providing a means of increasing the conversion to dihydroperoxide without increasing the total conversion per pass. By keeping the conversion per pass in a reasonably low range there is less by-product formation. The aqueous alkali solution containing the dihydroperoxide along with small amounts of the monohydroperoxide may then be directly subjected to the catalytic decomposition to form the corresponding phenolic compounds or the solution may be carefully neutralized to precipitate the hydroperoxides or the hydroperoxides may be extracted from the solution using a suitable solvent.

The aqueous alkali used in extracting the oxidate may be any of the alkali metal hydroxides, particularly sodium or potassium hydroxide. Sodium hydroxide is preferred. To increase solubility of the hydroperoxides in the alkali metal hydroxide solution, small amounts of lower alcohols which are water-soluble may be added to the aqueous solution. The concentration of aqueous alkali for extracting the oxidate is 0.1 to 15%, the preferred concentration being 0.1 to 8%.

After a reaction mixture containing dihydroperoxide and monohydroperoxide has been obtained, it is subjected to the action of an acidic condensation catalyst to effect decomposition of the hydroperoxides to the corresponding phenolic compounds. Exemplary catalysts are sulfuric acid, p-toluenesulfonic acid, aluminum chloride, boron trifluoride and acid-treated clays such as an acid-treated bentonite. The decomposition reaction mixture, preferably after neutralization or separation of the catalyst, then is distilled in the presence of an azeotroping agent for the dihydric phenol existing in the decomposition reaction mixture. As distillate there is obtained a mixture of the dihydric phenol, the monohydric phenol and the azeotroping agent.

The azeotroping solvent may be any high boiling substance which is substantially inert to the dihydric phenol and which is liquid at room temperature. Suitable azeotroping solvents are a gas-oil fraction boiling between 100° and 200° C. at 12 mm. mercury pressure, triisopropylbenzene, methyl naphthalene, chloronaphthalene, bromonaphthalene, 1,2,4-trichlorobenzene and chlorinated biphenyls containing about 20% to about 35% combined chlorine.

The chlorinated biphenyls are particularly well suited as an azeotropic distillation solvent for the dihydric phenols because they form azeotropes containing up to about 45% of the dihydric phenol, and the chlorinated biphenyl dissolves less than about 0.1% of the dihydric phenol at about 20° C. so that the azeotropic distillation is highly efficient and the dihydric phenol is easily separated from the chlorinated biphenyl by crystallization, whereby the chlorinated biphenyl thus reduced in dihydric phenol content can be returned to the distillation cycle. The chlorinated biphenyls are chlorine-substituted biphenyls wherein there are 1 to 2 chlorine substituents. The position of the chlorine is not generally critical, since the o-, m-, and p-monochlorobiphenyls are all operable, as also is the p,p'-dichlorobiphenyl. The individual isomers all melt above 30° C. consequently, it is preferable to use a mixture of two or more isomers so as to obtain a liquid distillate from which only the dihydric phenol crystallizes. Such a mixture of isomers is the product of chlorination of biphenyl with chlorine gas and having from about 20% to about 35% combined chlorine and boiling in the range of about 275° C. to about 320° C. for the former and in the range of about 290° C. to about 325° C. for the latter.

The azeotropic distillation may be carried out at either reduced pressure, atmospheric pressure, or slightly elevated pressure. The azeotrope is richer in dihydric phenol at the higher temperatures and the temperature is variable with the pressure. It is preferable to carry out the azeotropic distillation at reduced pressure in the range of about 10 to about 50 mm. mercury. However, pressures as low as 0.1 mm. mercury pressure are operable.

The distillate obtained may be cooled to crystallize the dihydric phenol. It is desirable that the distillate when hot be homogeneous in order that, on cooling, the dihydric phenol crystallizes directly from solution rather than separating first as a molten dihydric phenol phase. The crystalline dihydric phenol may be removed from the distillate by filtration and the crystals are advantageously washed with a low boiling solvent such as petroleum ether and dried. Small amounts of dihydric phenol may remain dissolved in the distillate and may be recovered therefrom by washing with water. The procedure of washing with water also may be applied to the original distillate for the purpose of extracting out all of the dihydric phenol.

After all of the dihydric phenol has been recovered from the distillate, the azeotroping solvent is extracted with an aqueous alkali metal hydroxide solution, particularly solutions of sodium hydroxide or potassium hydroxide. Sodium hydroxide solutions are preferred. The concentration of the alkali metal hydroxide in solution may be from about 5 to about 15%. The extraction may be carried out either batchwise or continuously, and the monohydric phenols may be recovered from the aqueous alkaline extract by acidification, which results in precipitation of the monohydric phenols as an oily phase. The latter then may be separated from the aqueous phase by decantation or may be removed from the aqueous phase by extraction with a suitable inert organic solvent and the organic solvent solution fractionated to isolate the monohydric phenol.

After recovering both the dihydric and monohydric phenols from the azeotroping solvent, the latter is recycled to the azeotropic distillation step. There is thus provided an improved process for producing dihydric phenols. The process permits recovery of dihydric phenols in highest yields and purity, and there is no alteration in the entraining and solubility characteristics of the azeotroping solvent.

What I claim and desire to protect by Letters Patent is:

1. A process for the manufacture and recovery of dihydric and monohydric phenols which comprises subjecting to acid catalyzed decomposition a reaction mixture containing a dihydroperoxide and a monohydroperoxide obtained by oxidation of a compound of a formula of the group consisting of

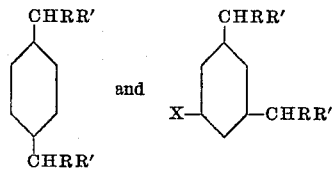

wherein R and R' represent alkyl groups having 1–2 carbon atoms and X represents a member of the group consisting of hydrogen, lower alkyl, and —CHRR', thereby producing a decomposition reaction product containing a mixture of a dihydric phenol and a monohydric phenol, distilling said mixture of phenols with an azeotroping agent for the dihydric phenol to recover a distillate containing the dihydric phenol, the monohydric phenol and the azeotroping agent, removing dihydric phenol from the distillate, extracting the residual distillate with an aqueous solution of an alkali metal hydroxide, recovering monohydric phenol from the aqueous alkaline extract, and recycling to the distillation step the azeotroping agent thus freed of dihydric and monohydric phenols.

2. The process of claim 1 wherein the alkali metal hydroxide is sodium hydroxide.

3. The process of claim 1 wherein the reaction mixture subjected to catalytic decomposition contains $\alpha,\alpha,\alpha',\alpha'$-tetramethyl-p-xylylene dihydroperoxide and $\alpha,\alpha$-dimethyl-p-isopropylbenzyl hydroperoxide.

4. The process of claim 1 wherein the reaction mixture subjected to catalytic decomposition contains $\alpha,\alpha,\alpha',\alpha'$-tetramethyl-m-xylylene dihydroperoxide and $\alpha,\alpha$-dimethyl-m-isopropylbenzyl hydroperoxide.

5. The process of claim 1 wherein the azeotroping agent is a chlorinated biphenyl containing about 20% to about 35% combined chlorine.

References Cited in the file of this patent

UNITED STATES PATENTS

| | | |
|---|---|---|
| 1,873,900 | Miller | Aug. 23, 1932 |
| 1,912,628 | Elliott | June 6, 1933 |
| 2,736,753 | Jacobs | Feb. 28, 1956 |

FOREIGN PATENTS

| | | |
|---|---|---|
| 641,250 | Great Britain | Aug. 9, 1950 |